UNITED STATES PATENT OFFICE.

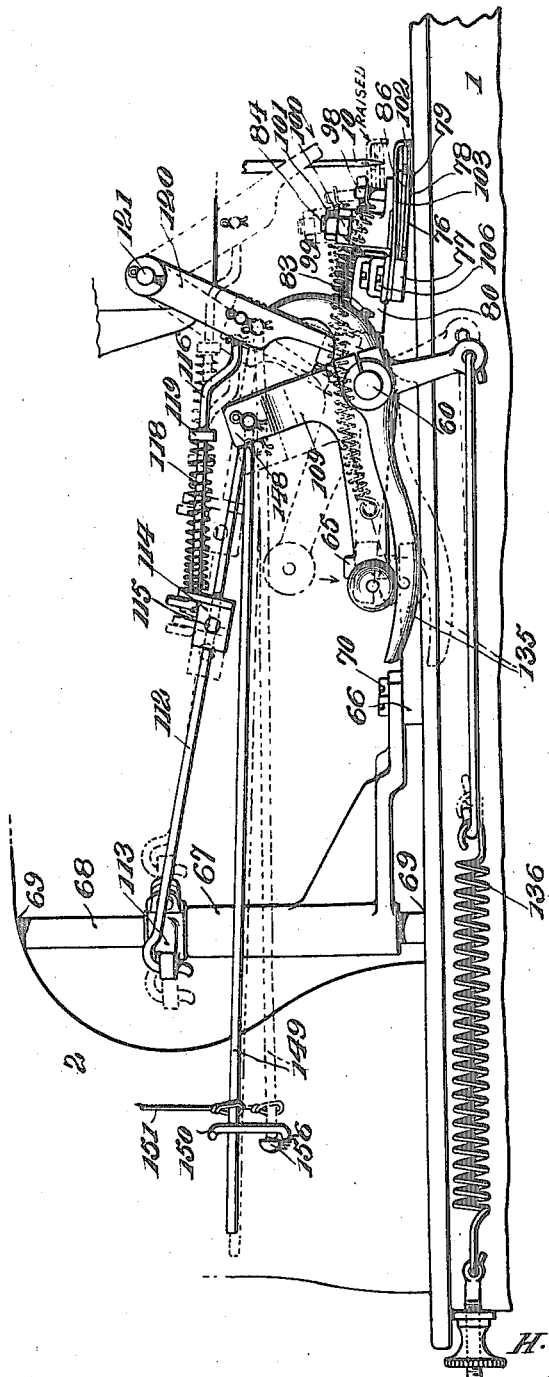

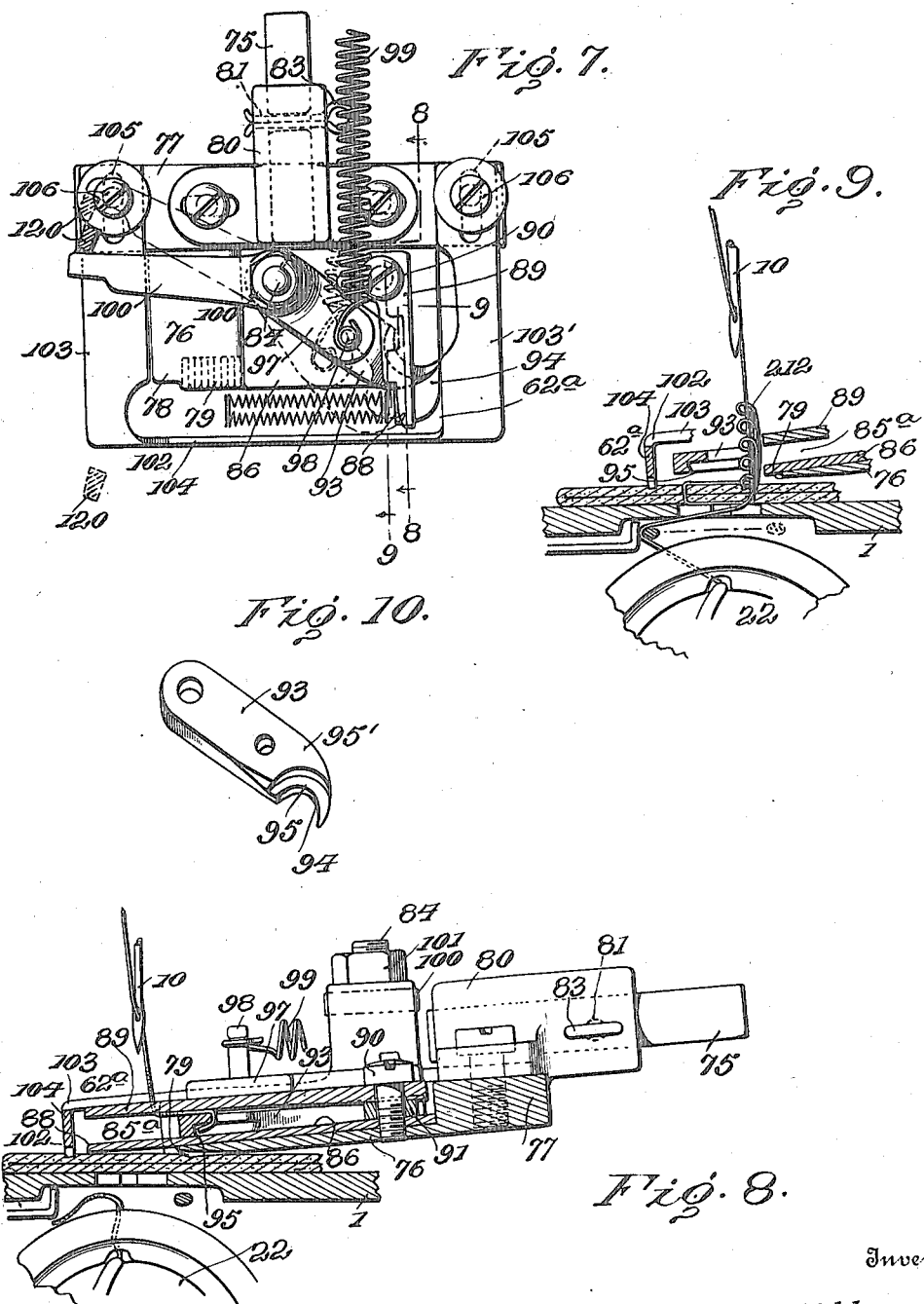

HENRY C. MILLER, OF WATERFORD, NEW YORK.

BUTTONHOLE-SEWING MACHINE.

1,164,379.   Specification of Letters Patent.   Patented Dec. 14, 1915.

Application filed April 28, 1910. Serial No. 558,262.

*To all whom it may concern:*

Be it known that I, HENRY C. MILLER, a citizen of the United States, residing at Waterford, in the county of Saratoga and State of New York, have invented certain new and useful Improvements in Buttonhole-Sewing Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in button-hole sewing machines.

The object of the invention is to provide means, whereby the stitching operation will at the end of a cycle of movement, form a plurality of loops of the bobbin thread on the needle thread, above the material being operated upon whereby both said threads will be positioned to be severed.

A further object of the invention is to provide manually operated thread trimming or severing mechanism, by means of which the needle and bobbin threads will be simultaneously severed, and said threads positioned for the next successive stitching operation.

The invention also relates to improvements in the means employed for automatically regulating the tension of the needle thread, so as to permit of the stitching mechanism forming the loops of one thread around the other thread, for effectually placing them in condition to be severed.

The invention also comprehends improvements in the means employed for operating the combined cloth clamp and feeding means, whereby the latter will be held stationary at determinate periods for the formation of the stitches and the loops.

The invention also relates to the specific details of construction and arrangement of parts, which will be hereinafter described and particularly pointed out in the claims.

Figure 1:
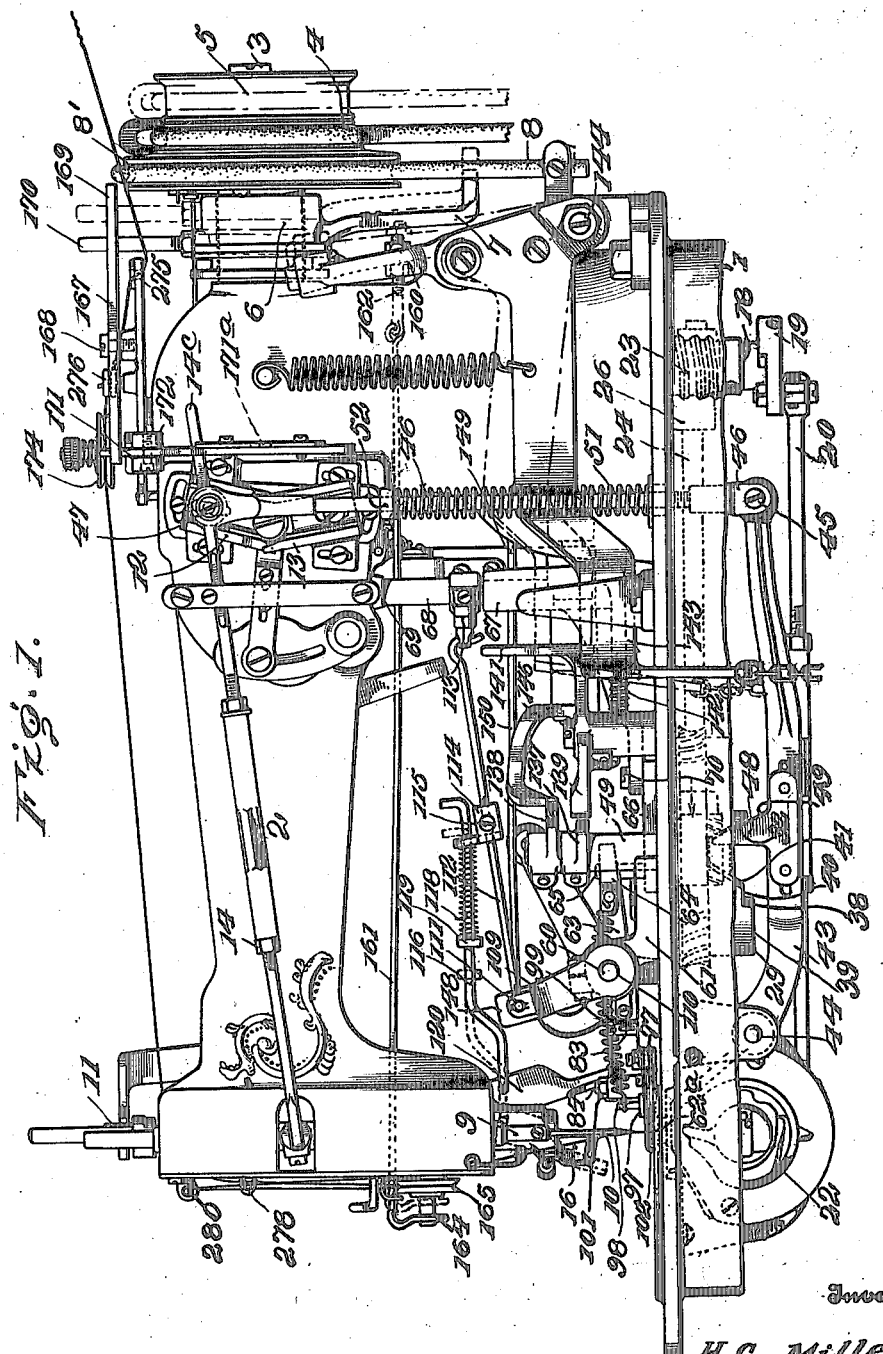
Figure 2:
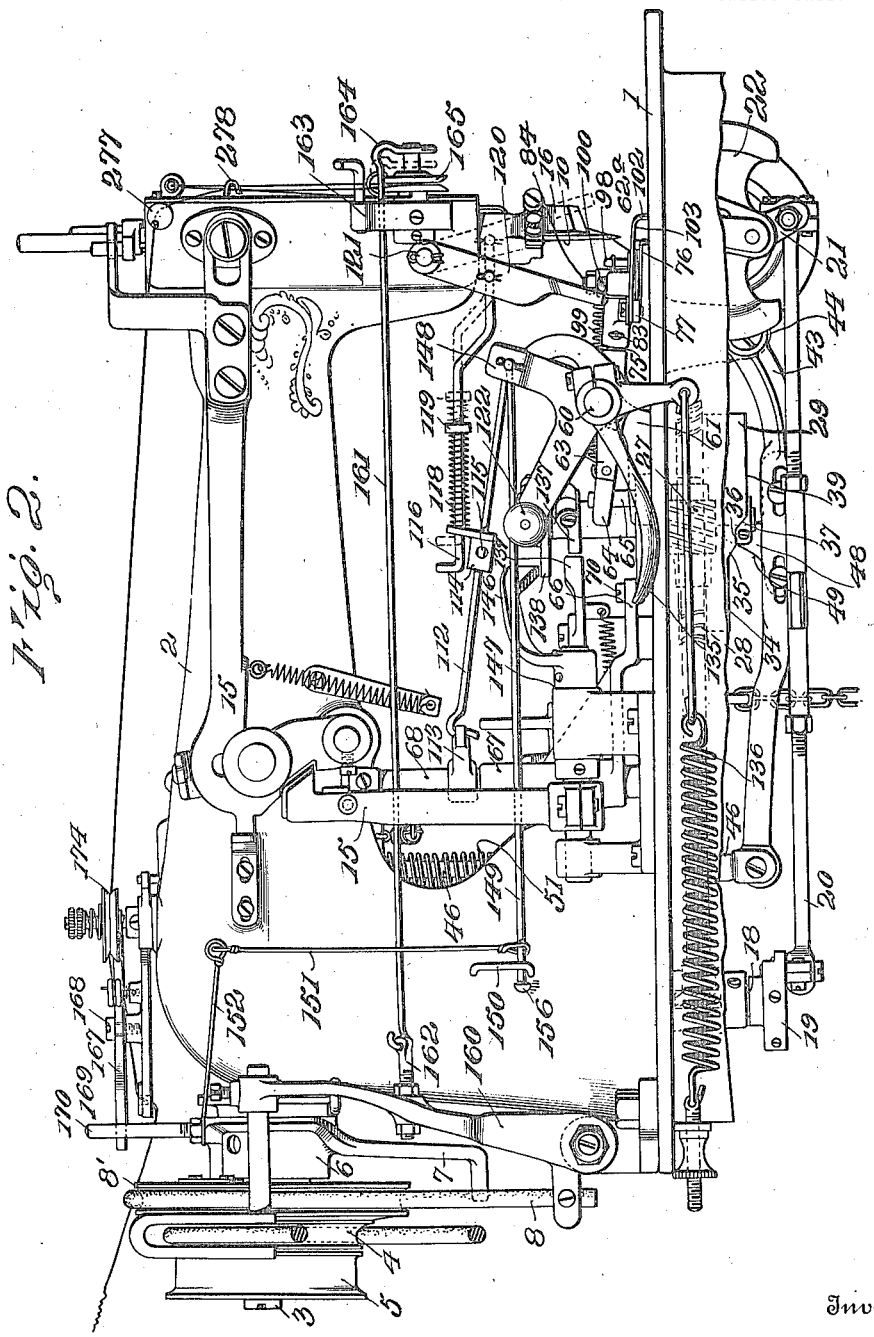
Figure 3:
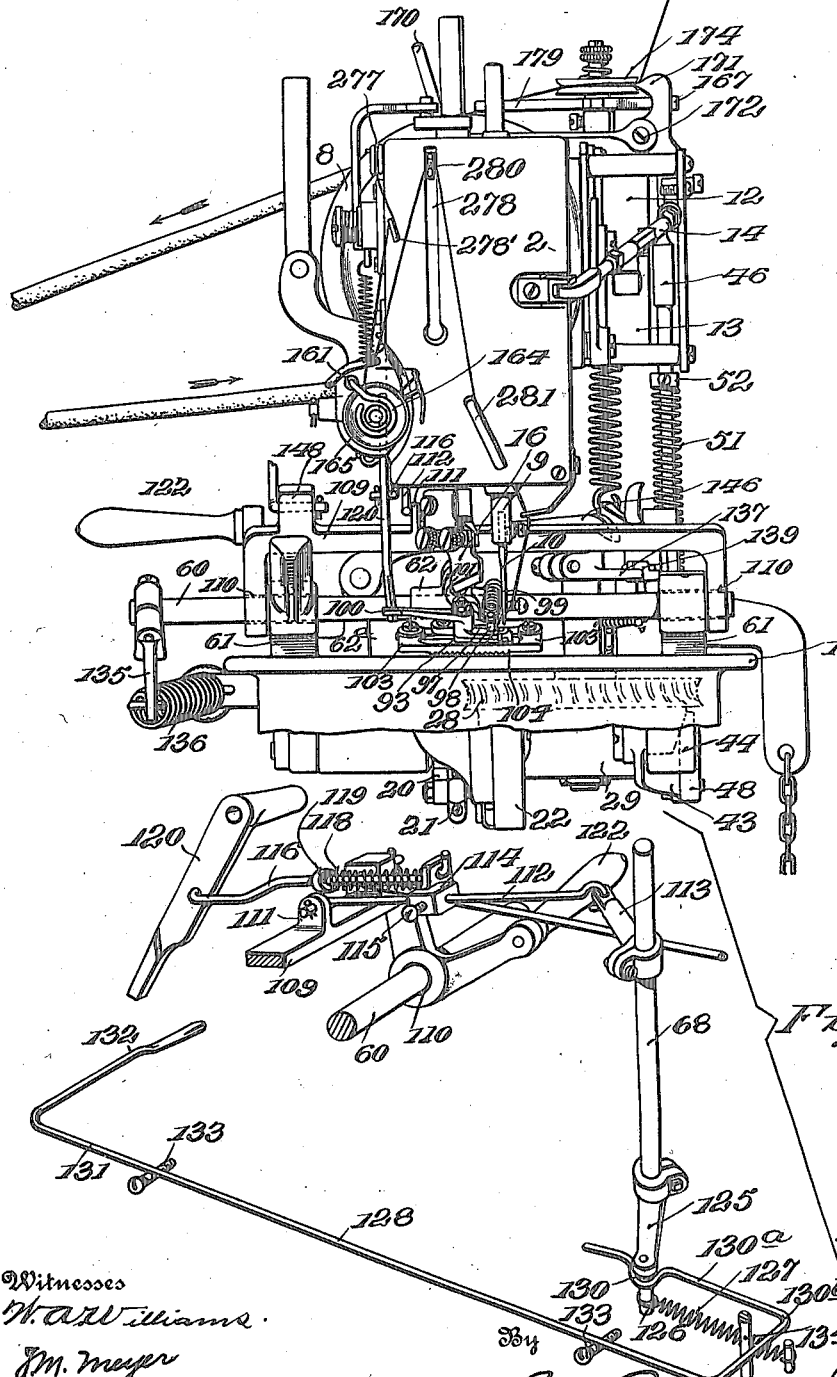
Figure 4:
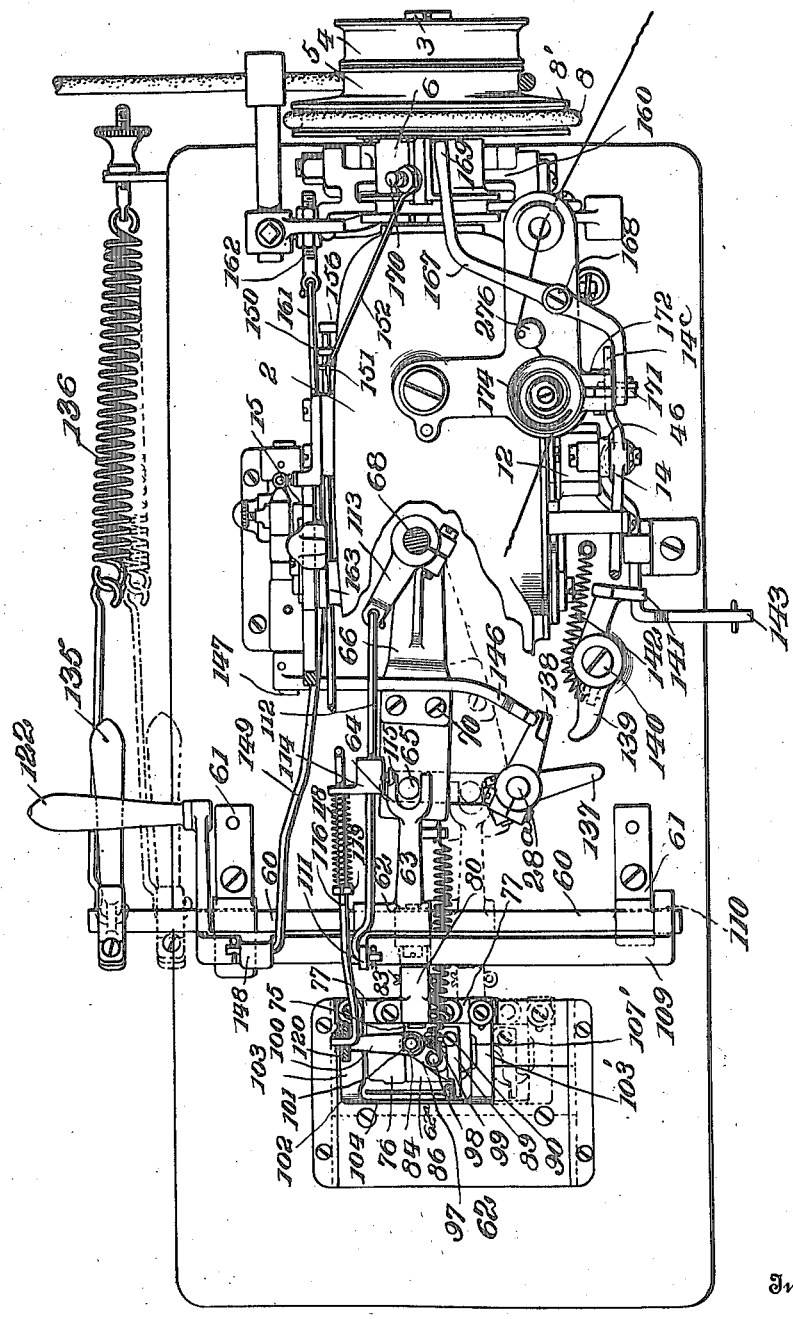
Figure 5:
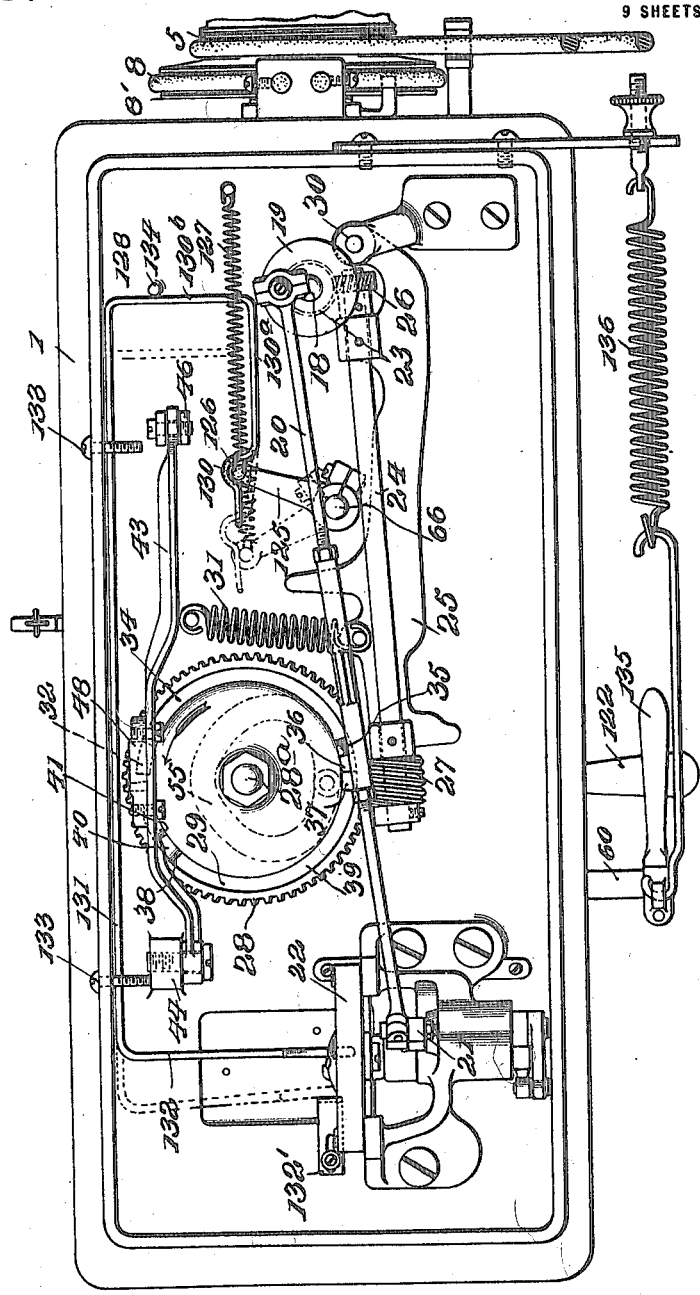
Figure 11:
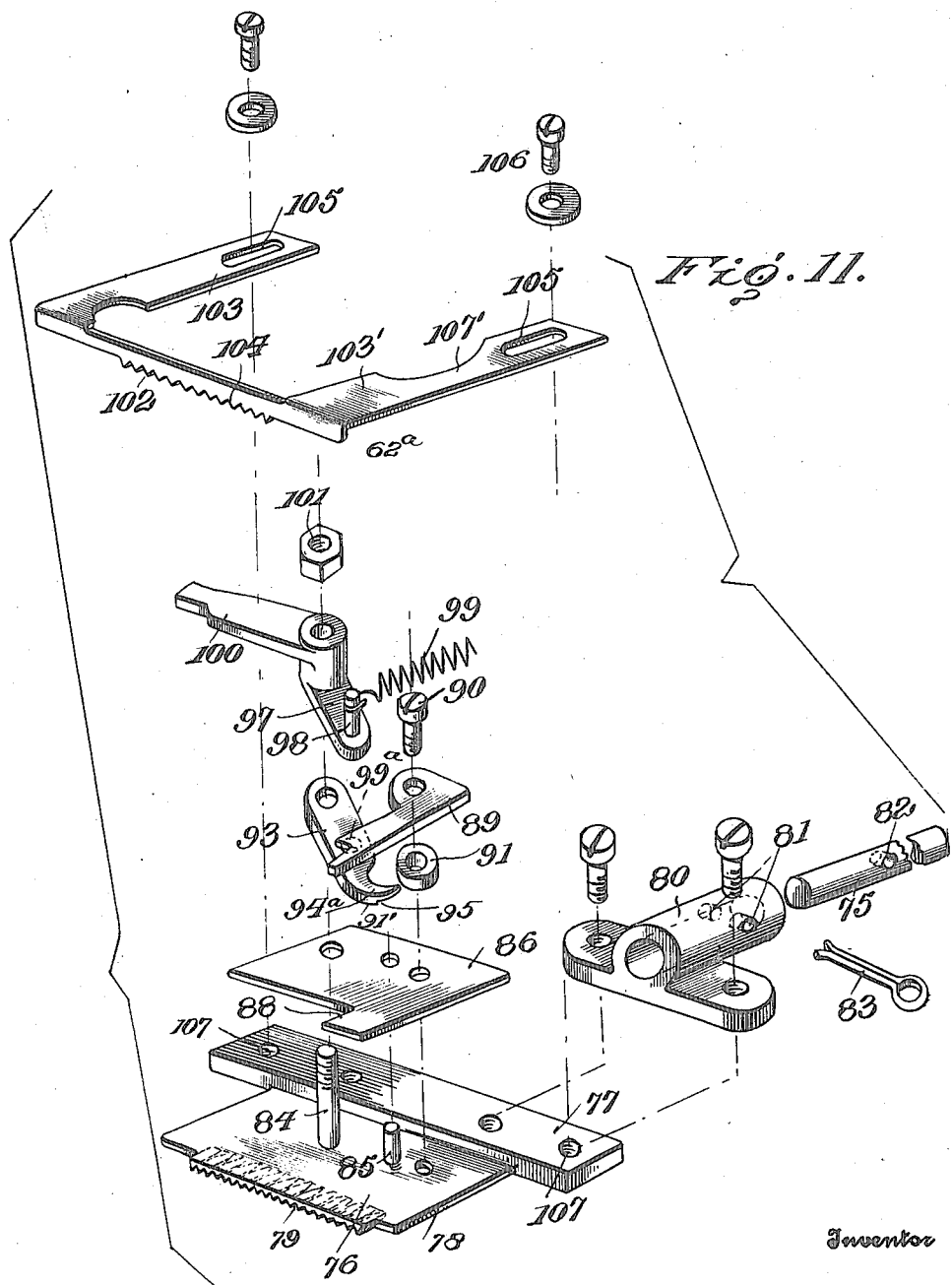
Figure 13:
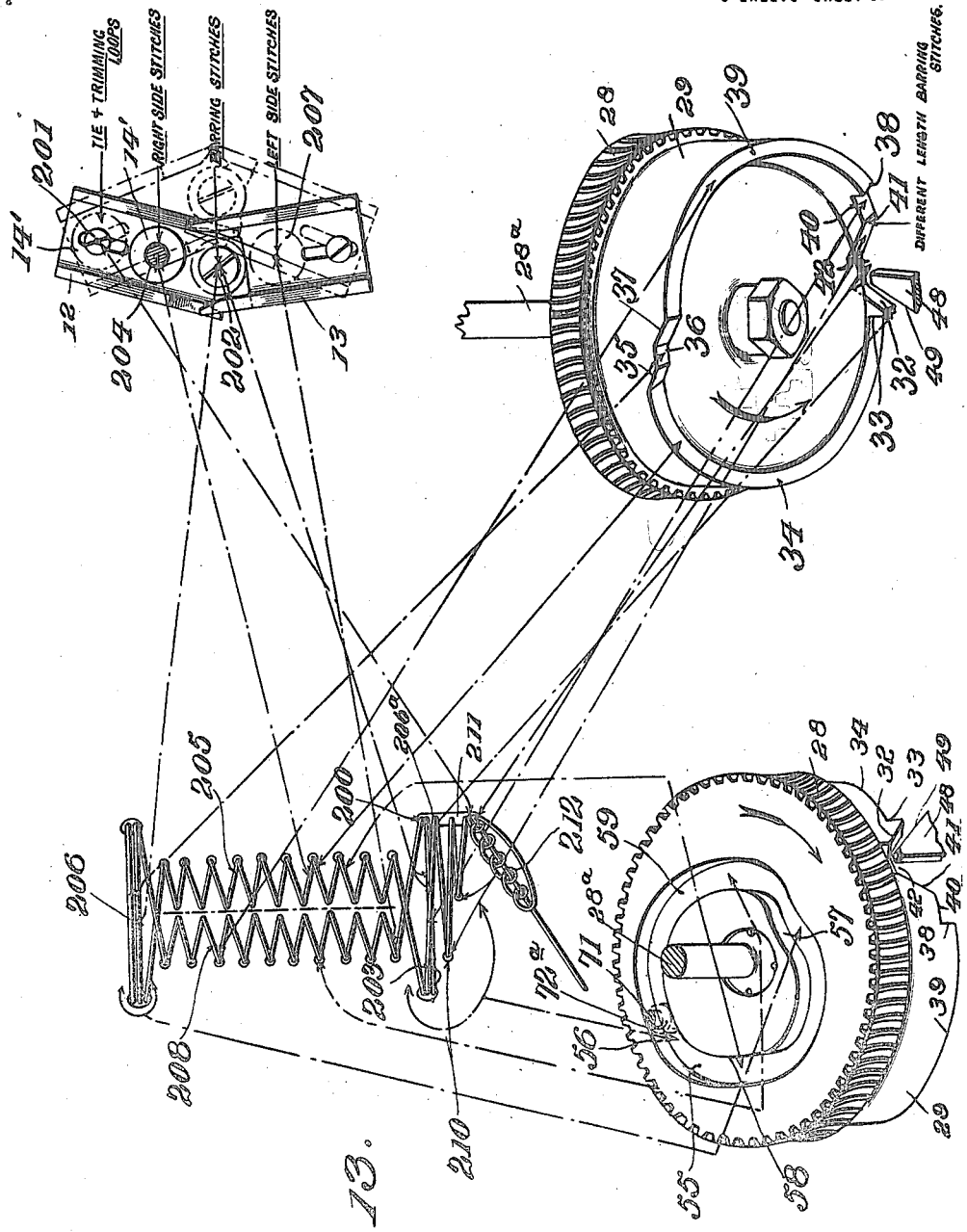

In the drawings:—Figure 1 is a side elevation of a sewing machine constructed in accordance with my invention, illustrating the position of the parts at the instant the stop motion device has been thrown to start the machine. Fig. 2 is a similar view looking from the opposite side of the machine. Fig. 3 is a front elevation, the parts being in the position illustrated in Fig. 1. Fig. 4 is a top plan view, a portion of the head being broken away, the parts being in the position shown in Fig. 1. Fig. 5 is a bottom plan view. Fig. 6 is a detail side elevation, similar to Fig. 2 illustrating in full lines the position of the manually operating handle when depressed to contact with the cloth clamp lifting device, and in dotted lines the normal position of said handle, and also in dotted lines showing the position of said handle and the clamp lifting handle in its movement to lift the cloth clamp. Fig. 7 is a top plan view of the cloth clamp. Fig. 8 is a sectional view on the line 8—8 of Fig. 7, but illustrating the position of the parts previous to the starting of the stitching operation. Fig. 9 is a transverse section on the line 9—9 of Fig. 7, illustrating the loops of the bobbin thread around the needle thread preparatory to being severed. Fig. 10 is an inverted detail perspective view of the combined pull-off and cutter. Fig. 11 is a perspective view of the parts forming the combined cloth clamp and feeding means, and the parts carried thereby, separated. Fig. 12 is a detail perspective view of a portion of the manual means for operating the combined pull-off and cutter, and the device for holding the bobbin thread. Fig. 13 is a view illustrating in diagrammatic form a stitched button-hole; the toggle levers; the cam which operates with the toggle levers; and the cam for controlling the movement of the cloth clamp; dotted lines being shown for the purpose of indicating the parts of the elements which form various stages of the stitches.

1 indicates a base and 2 a head or arm arising therefrom. Mounted in the head or arm is a shaft 3, on which is mounted fast and loose pulleys 4 and 5. Coöperating with the shaft 3, and the fast and loose pulleys 4 and 5, is a stop motion device such as shown and described in my Patent No. 876,211, issued Jan. 7, 1908, and Patent No. 1,033,721, issued July 23, 1912. This construction includes, among other elements a centrifugally operated pawl adapted to contact with a lug carried on a collar 6, which has an arm 7, through which a brake belt 8, passes to stop the rotation of the fast pulley and the shaft 3, and which controls the movement of the sewing mechanism. The collar 6, and its arm 7, are so constructed and mounted, that in the operation of the stop motion device the said collar and arm, when the centrifugal pawl engages its stop, a slight lateral movement is imparted to tighten the belt 8, on its friction wheel 8', whereby the mechanism is stopped as described in the patents referred to. In all other essential respects the construction and operation of the stop motion device is substantially the same as that described in the patents and further reference thereto in connection with this case is deemed unnecessary.

The shaft 3, is connected, by suitable mechanism in the head 2, to vertically reciprocate a needle bar 9, carrying a needle 10, at its lower end. The needle bar is laterally vibrated by a gate indicated at 11, the movement thereof being controlled by a pair of toggle levers 12 and 13, and an operating rod 14. The construction of the toggle levers, the connection with the gate, and the function of the operating rod are well known in the art, and further detailed description is deemed unnecessary.

The cutting mechanism of the present invention forms no material part thereof, and as I contemplate the use of any known suitable type, I have indicated such mechanism generally by 15 (Figs. 2 and 4) the blade being indicated by 16 (Fig. 3). So far as the cutting blade and the operating mechanism therefor, *per se* is concerned, the present invention does not relate thereto, but is shown for the purpose of illustrating a complete button hole machine.

A vertical shaft 18 is mounted in the head 2, and it is geared to the shaft 3, whereby to operate the looper, and the cams for operating the connection which coöperates with the toggle levers, and the cloth clamp. On the lower end of the shaft 18, is a disk 19, having a pin, to which is pivoted a connecting rod 20, connected at its opposite end to an arm 21 of an oscillating looper 22, which may be of any preferred construction. On the shaft 18, is mounted a worm gear 23, which meshes with a worm 26, on a shaft 24. The thread of the worm gear 23 is partially spiral and partially concentric, as indicated in Fig. 1, to intermittently impart motion to the shaft 24, the latter being mounted on a pivoted frame 25, under the base 1. On the opposite end of the shaft 24, is secured a worm 27, which meshes with a worm gear 28 secured to a shaft 28ª and having a depending flange 29, on the lower edge of which is formed a series of cam surfaces for changing the position of a roller 14' operating in connection with the toggle levers and located on the pivotal connection between the operating rod 14, and a vertical rod 46. The frame 25, is pivotally mounted on the base at 30, and a spring 31 which is connected to the frame, and a stud on the base serves to keep the worm 27 in mesh with the worm gear 28, as shown in Fig. 5. This construction is of considerable importance in a machine of the type herein described, as it performs two very essential functions. By swinging the plate 25, so as to disengage the worm 27 from the worm gear 28, a cam of a different size may be substituted, to form button-holes of different lengths, which is the only change necessary for altering the machine to produce a desired sized button-hole. The parts are so arranged that the feed is positive and the length and number of the series of stitches cannot be greater or less in any two cycles of operations, by the operator. The second function performed by the pivoted frame, is in case for any reason the feeding means should work too hard, the worm 27, will be automatically thrown out of gear with the worm gear 28, and thereby avoid the liability of damaging the parts.

32 indicates one of the cam surfaces on the underside of the flange 29, which inclines from a zero point at the top toward the bottom, in the direction of the movement of the flange, and abruptly terminates to form a step, indicated at 33, which terminates below the level of the zero point. At the upper end of the step 33, the flange 29, continues in a plane 34, which extends for a considerable distance under the worm gear 28, but below the plane of the zero point. At the end of the edge portion 34 of the flange is another downwardly inclined surface 35, merging into a short horizontal surface edge 36 which is on a level with the bottom of the inclined surface 32, from whence the edge inclines downwardly again at 37, to a level 39, considerably below the plane of the bottoms of the inclined surfaces 32 and 35, and which continues for a considerable distance around the edge of the flange 29, to a point 38. At this point there is a step to a surface 40, the level of which is on a plane with bottoms of the inclined surfaces 32 and 35. From the point 40 the cam surface inclines upwardly as at 41, and terminates in a plane with the zero point but is spaced therefrom, as at 42. The inclined surface 41, is of greater length than the inclined surface 32, as shown in Fig. 13, the purpose of which will be described later on.

A lever 43, is pivotally mounted to a lug 44, depending from the underside of the base, and it is connected at 45 to the vertically disposed rod 46, the upper end of which is pivoted to the connecting rod 14, the pivotal connection being indicated at 47, and on the latter is mounted the roller 14'. Adjustably secured to the lever 43, is a vertical lug or projection 48, having an inclined surface 49, adapted to coöperate with the various cam surfaces formed on the lower edge of the depending flange 29, and which is the means employed for shifting the roller 14' with reference to the toggle levers 12 and 13. A spring 51, is interposed between a flange 52, on the rod 46, and the base 1, for the purpose of returning the rod 46, the connection 14, and the lever 43, to normal position, and to hold the vertically disposed lug 48, in operative position against the various cam surfaces, in the operation of the machine.

On the upper face of the worm gear 28, is formed a cam groove 55, which imparts to the cloth clamp an intermittent movement back and forth in a determinate path, and which also constitutes the feeding means. The cam is substantially heart shape in plan view, as shown in Fig. 13, and has two dwells 56 and 57, at opposite points for the purpose of stopping the movement of the cloth clamp. The first dwell 56, is of greater length than the second dwell 57, while the distance each side of the ends of the dwell points is of substantially the same length as indicated at 58 and 59, so that the feeding movement of the cloth clamp is exactly the same on each side the center of the dwells for a purpose to be described later on.

A shaft 60 is mounted in bearings 61 on the upper side of the base 1, and it is adapted to be rocked, and it carries the cloth clamp indicated at 62ª. Adjustably mounted on the shaft 60, is a collar 62, provided with an inwardly extending arm 63, which is bifurcated at its inner end 64, to engage with a pin or stud 65, extending upwardly from an arm 66, having an extended bearing 67, mounted on a shaft 68, supported in bearings 69, on the head 2 and the base 1. The arm 66 is made in two sections, the sections being adjusted by means of screws 70. The purpose of adjusting the arm 66, is to enable the operator to properly set the roller 72ª in the cam groove, and to otherwise adjust the parts. Depending from the underside of the arm 66, is a stud 71, which is in alinement with the pin or stud 65. On the stud 71, is an anti-friction roller 72ª, which travels in the cam groove 55, to impart motion from the latter, to the arm 66 when the machine is in operation. Extending outwardly from the collar 62, is a stud or projection 75, which carries the cloth clamp.

The cloth clamp and feeder comprises several elements and has associated therewith the devices for holding and severing the threads.

76, indicates a main clamping plate, comprising an end bar 77, and a thin plate 78, extending from the end bar, and having a plurality of teeth or serrations 79, on its outer bottom edge. Attached to the end bar 77, is a sleeve 80, provided with two alined transverse openings 81. The lug or projection 75, fits into the sleeve, and it is formed with an opening 82, which registers with the openings 81, in the sleeve, and through these registering openings passes a cotter pin 83, to secure the cloth clamp in position. The opening 82, in the stem or projection, is slightly larger in diameter, than the alined openings 81, so as to allow a slight rocking movement of the cloth clamp, to permit the latter to adjust itself to make a uniform contact on the fabric, in case there should be any irregularities in the latter, while it is being operated upon by the sewing mechanism. Extending upwardly from the plate 78, are two lugs 84 and 85, the lug 84, being threaded at its upper end. A stationary shear plate 86 fits snugly on the thin plate 78 and is formed with openings through which the lugs 84 and 85 pass. The free end of the stationary shear plate 86 is formed with an extension 88, which projects beyond the plane of the teeth or serrations 79, as shown in Fig. 8. Fitting over and spaced from the stationary shear plate near one end of the latter is a thread clamping element 89, secured to the thin plate 78 by means of a screw 90, there being a washer 91 interposed between the thread clamping element, and the stationary shear plate to properly space the former from the latter to form a throat 85ª. The outer end of the thread clamping element is located over the extension 88 of the stationary shear plate, and is somewhat resilient. Mounted on the stud 84, is a combined thread pull-off and cutter element 93, formed at its free end with a curved hook 94, which is reduced in thickness on its bottom side as shown at 95, the hook end being adapted to operate in the throat formed between the thread clamping element 89, and the stationary shear plate 86. The movement of the pull-off and cutter element, is limited in the throat by the stud or projection 85. Mounted on the stud 84, is a hub, having an arm 97, lying directly over the combined pull-off and cutter element, and extending from the arm is a stud 98, which fits into an opening 99ª, in the combined pull-off and cutter element, to cause the latter to move with the hub. The stud, 98, also extends above the arm 97, and has attached thereto a spring 99, for the purpose of restoring the combined pull-off and cutter element, to its normal position in the throat, and against the stud 85, as shown clearly in full lines in Fig. 7. Projecting from the hub is an arm 100, extending in a direction substantially opposite to that of the arm 97, and which lies in the path of movement of an operating lever which will be later referred to. A nut 101, is placed on the threaded end of the stud 84 to hold the several previously described elements together.

Coöperating with the main clamping plate 78 and adjustably secured to the end bar 77, is a resilient clamping member 102, which comprises a pair of arms 103 and 103' connected at their outer free ends by a bar 104, which is serrated on its under side to form a series of teeth, which coöperate with the teeth or serrations 79, to hold the fabric during the stitching operation. The arms 103 and 103' are formed with slots 105, through which pass screws 106, engaging openings 107 in the end bar 77, of the main clamping plate. The inner edge of the arm 103' is cut away at 107' to permit the small pieces of thread and lint to be readily removed from the parts.

Mounted on the shaft 60, is a yoke 109, having openings 110, to form bearings, by means of which the said yoke is mounted on the shaft, the downwardly extending arms of the yoke fitting snugly over the outer surfaces of the bearings 61, to hold the yoke in proper position, and to prevent lateral movement of the latter when the shaft 60, slides back and forth during the operation of the machine. Extending upwardly from the yoke 109, is a perforated lug 111, which receives the end of a link 112, connected at its outer end to an arm 113, secured to the shaft 68. On the link 112, is a lug 114, which may be adjusted by a set screw 115. Passing through a perforation in the lug 114, is the end of a link 116, the end passing through the opening being turned up and held in contact with the inner surface of the lug by a spring 118, encircling the link, and interposed between the lug and a collar 119. The opposite end of the link 116, is attached to a lever 120 pivoted to the head 2, at 121, the lower end of the lever being positioned to contact with the outer end of the arm 100, on the cloth clamp, and at a predetermined time is adapted to strike said arm 100, to turn it on its pivot against the tension of the spring 99, to operate the combined pull-off and cutter. When the operator depresses the handle 122, the yoke is rocked on the shaft 60, and it operates the combined pull-off and cutter and it also turns the shaft 68, through the instrumentality of the link 112, and arm 113, to operate the bobbin thread clamping device, to hold the bobbin thread during the period the threads are being severed. To the lower end of the shaft 68, is secured an arm 125, having a depending pin 126, at its outer end, to which is secured one end of a spring 127, the opposite end of the spring being secured to a stud or other support depending from the base 1. Associated with the arm 125, is a bobbin thread holding frame 128, which consists of a stout wire located under the base 1. The wire is bent to provide a short end 130$^a$ formed with a crimp 130, to form a seat for the pin 126. The wire is bent toward one side of the base to provide an end bar 130$^b$, and is then bent again to provide a guide member 131, which is parallel with the short end 130$^a$, and which fits snugly against the flange of the base 1, and is supported by pins 133. The guide member 131, extends to a point opposite the looper, where the wire is again bent to form an end member 132, which at the proper time will engage the bobbin thread to draw the latter from the bobbin and hold the same against an adjustable stop 132'. The frame 128, is limited in its movement in one direction by a pin 134, and in the opposite direction by the adjustable stop 132'. The handle 122, is located directly over, and spaced from a handle or arm 135, secured to the sliding rock shaft 60. The sliding rock shaft 60, is held in normal position by spring 136, secured at one end to a depending arm and at its opposite end to a lug on the base 1.

The shaft 28$^a$, on which the worm gear 28, is mounted extends upwardly through the base 1, and has attached thereto two arms 137, and 138. The arm 137 sweeps in the path of movement of an arm 139 pivoted at 140, and has formed on it a latch 141, which is held in normal position by a spring 142. The latch 141, is adapted to fit over and hold down the end of a lever 143, pivoted at 144, and having its opposite end connected to the swinging frame 160, of the stop motion device, in substantially the same manner as that shown in my patent previously mentioned. The arm 138, is located to sweep under a lever 146, which is pivoted at 147, to operate the cutting blade mechanism 15, in substantially the same manner as shown and described in the patent to Hogan previously referred to.

Pivoted to a lug 148, on the yoke 109 is a rod 149, whose opposite free end operates in a guide 150, on the machine arm 2. Loosely connected to the rod 149, is a link 151 connected to an arm 152, secured to the collar 6, of the stop motion device, so that when the collar is rocked it will elevate or lower the connections 151 and 152, which in turn will lift the rod 149, in the guide 150, and out of engagement with the lug 156.

With my present improvement it is absolutely essential that the tensioning devices be so regulated that during the formation of certain of the stitches, the needle thread will be under normal tension; at other times the tension will be less than normal; and at other times, the tension will be somewhat greater than normal. I have, therefore, provided means whereby the tension of the needle thread will be automatically taken care of during the formation of the stitches.

Connected to the tilting frame 160, of the stop motion device is a rod 161, which may be adjusted by means of nuts and a screw 162, and which passes through a guide 163, on the head 2 of the machine. The free end of the rod 161, is formed into a head 164, to engage over the face of one of a pair of tensioning disks 165, on the side of the head 2, so that when the tilting frame is operated to throw the power belt from the fast to the loose pulley, it pulls on the rod 161, and the head 164, clamps the thread between the tensioning disks 165, and imposes a greater tension on the needle thread than that required in the normal operation of the machine. On top of the head 2, is a lever 167 pivoted at 168 and having one end 169 in the path of movement of a pin 170, secured to the collar 6, of the stop motion device. The opposite end of the lever 167, is adapted to bear against a lever 171, pivoted at 172. The upper free end of the lever 171, is beveled on its edge, and is adapted to fit in between two tension disks 174, to release the tension at this point at the time the stop motion collar 6, rocks in its operation, when the machine is being brought to a stand-still.

The needle thread is passed through a guide 275, thence between the tension disks 276, 174 and 277 through the guide 278 and between the tension disks 165, thence through an eye of the reciprocating lever 280, through an opening 281, in the head and thence to the needle.

In the drawings the parts are shown in position where the stop motion device has been operated by the depression of the end of the lever 143, which throws the frame 160. This movement transfers the power belt from the loose to the fast pulley and therefore starts the stitching mechanism operating. The lever 143 is held in its depressed position by the latch 141, as shown in Fig. 1. The cloth clamp and the other operating parts of the mechanism, are at this time in the same position as if the stop motion had not been thrown, hence for the purpose of describing the operation of the machine it will be assumed the parts with the exception of the stop motion device are in their normal position and ready to receive a piece of fabric to receive a button-hole.

Referring to the plan view, Fig. 4, the operator depresses either the handle 122 or the handle 135 and thereby rocks the shaft 60, and hence elevates the cloth clamp sufficiently for the introduction of a piece of fabric to receive the button-hole. Immediately pressure on the handle 135 is released the spring 136, will return the shaft 60, and hence the clamp to its normal position on the base 1. When the cloth clamp is lowered toward the base the serrations or teeth 79, on the main clamping plate will first engage the fabric. The bar 104, of the resilient clamping element 102, extends below the resilient arms 103 and 103′ and the teeth or serrations thereof, are so arranged that they will engage the fabric before the teeth or serrations 79, but because of the resiliency of the arms 103 and 103′, they will give sufficiently to permit the serrations 79 to come down and also engage with the fabric, and the latter is thereby engaged along two opposite spaced planes to insure a positive feeding action. Should there be any irregularity in the fabric, the clamp will accommodate itself by reason of the perforations 81, and 82, and the cotter pin engaging the same, affording a slight limited movement between sleeve 80, and the said stem 75. When the machine is in normal position the lever 120, is back of the end of the arm 100, and cannot therefore operate on the latter, the said lever having been automatically left in this location when it previously operated on the arm to sever the threads. The fabric having been positioned under the cloth clamp the operator depresses the lever 143, and thereby throws the stop motion device into the position shown in the drawings and motion is imparted to the shaft 3.

As previously stated the shaft 3, is geared to the vertical shaft 18, and the looper is oscillated in the usual manner, directly under the throat plate in the base of the machine. The revolution of the shaft 18, also imparts an intermittent movement, through the specially formed worm 23, and the gear. This intermittent motion is positive, by reason of the spiral formation of the threads in the worm, which insures absolute uniformity in the step by step movement of the cloth clamp, for because of this construction there can be no lost motion or irregularity of the movement of the parts, as the gears are always in mesh. The intermittent movement of the shaft 24, is transmitted to the shaft 28ª, carrying the cams, by the worm 27, and worm gear 28. At the time the power is thrown to the fast pulley, as shown in the drawings, the roller 72, is located intermediate the dwell 56, as shown in the diagram, Fig. 13, and therefore no motion will be imparted to the cloth clamp, and at this time there is no lateral vibratory movement imparted to the needle bar 9, several stitches are formed and tied together on the inner side of the plane in which the proposed button-hole is to be formed in the fabric, or at the point indicated at 200, in the diagram shown in Fig. 13. This is due to the fact that the operative face of the lug or projection 48, is slightly spaced from the upper end of the inclined cam surface 32, at the zero point, and while it is true the cam is moving, no motion will, at this time be imparted to the lever 43. As the pivot 47, between the rods 46, and the connecting rod 14 is located in direct alinement with the upper pivotal connection 201, of the toggle levers, obviously the needle will only be vertically reciprocated during this period. Immediately, however, the short inclined cam surface 32 comes into contact with the operative face 49 of the lug 48, it depresses the latter, and thereby moves the rod 46, downwardly until the roller 14' is directly over the center screw 202, connecting the two toggle levers, at which position the toggle levers impart motion to the connection 14, hence the gate 11, carrying the needle bar. When in this position the needle bar receives its greatest lateral movement for placing the end barring stitches. During the time the cam 32, is in engagement with the lug 48, it is of course moving the roller 14' from the position 201, down to the central connection or screws 202, which imparts lateral movement to the needle bar and one end barring or more preliminary barring stitches 203 are formed. During the formation of these preliminary barring stitches 203, the roller 72, is still in the dwell 56, of the heart shaped cam, hence the cloth clamp is stationary. The parts are so timed, that when the roller 72, reaches the end of the dwell 56, the projection 48 will have been suddenly drawn up by the spring 51 into contact with the edge 34, of the depending flange 29 when the roller 72, immediately commences to travel in the cam portion 58, of the heart shaped cam 55. When the projection 48, comes into contact with the edge 34, of the flange 29, it will have advanced the roller 14' to the position indicated at 204, in full lines, in Fig. 13, and thereby reduces the amplitude of the lateral vibrations of the needle, to form one row 205, of the purl stitches, it being understood that at this time the cam, by reason of the intermittent movement imparted through the movement of the gears, is imparting an intermittent movement to the cloth clamp, hence to the fabric, under the needle. When the purl stitches 205, are completed the projection 48, will engage the surfaces 35 and 36, which shifts the roller 14', from the position indicated at 204, again to the position indicated at 202. Just at this time the dwell 57, of the heart shaped cam reaches the roller 72, and the cloth clamp is held stationary a sufficient length of time for the toggle levers 12 and 13 to vibrate sufficiently to form the opposite end barring stitches 206. As the cam continues to be intermittently revolved, the inclined edge 37 contacts with the projection 48, and moves it down to the edge 39, of the flange 29, which positions the roller 14' below the center of the toggle levers as indicated in dotted lines at 207, in Fig. 13. At the time this action is taking place, the cam portion 59, of the heart shaped cam 55, contacts with the roller 72, and imparts a reverse step by step motion to the cloth clamp, and thereby feeds the fabric under the needle to receive the opposite purl stitches, 208. At this point it will be observed, as is usual in a toggle lever connection of this type, the pivotal points of the respective levers are disposed out of vertical alinement with each other, whereby to place the opposite series of purl stitches each side of a medial line. In the continued operation of the machine, the projection 48 will be drawn up by its spring 51 into contact with the edge 40, of the depending flange 29, which will again position the roller 14' in the center of the two toggle levers, as indicated at 202, at which time, the dwell 56, of the heart shaped cam will have also reached the roller 72, and thereby stop the step by step movement of the cloth clamp. While it is true the movement of the cloth clamp ceases, it is also true that the worm gear 28, continues to move intermittently and in so doing, and while the projection 48, is in contact with the edge 40, additional stitches 206ª are formed over the stitches 203 to complete the end bar started at the beginning of the operation. These stitches having been formed the inclined edge 41, will engage the projection 48, and the roller 14' will be moved from the point indicated at 202, to its normal position 201. The inclined edge 41, is of such length that it will gradually move the roller 14', from the point 202, to normal position, hence a series of stitches 210, of various length, one over the other, will be formed. When the end of the inclined surface 41, is reached the projection 48, assumes its normal position, and the two threads will be tied together as the needle is reciprocating in a vertical plane. At this time the arm 137, strikes the end 139 of the latch 141, and releases the lever 143, to operate the stop motion device to shift the power belt from the fast to the loose pulley to stop the machine. It is at this time an important result in the operation of the machine is accomplished.

As previously stated, in connection with the stop motion device, when the frame 160, is thrown to normal position the speed of the rapidly revolving shaft and the fast pulley is reduced, until the centrifugally operated pawl drops and engages its stop with the result that the shaft makes several revolutions.

It will be observed that the terminal of the inclined surface 41, is spaced from the upper terminal of the inclined surface 32, hence while the worm gear 28, is still moving, no movement will be imparted to the projection 48. Although the power belt has been thrown from the fast to the loose pulley, the stitching mechanism is operated by the momentum, so that it follows further stitches will be formed. The needle vertically reciprocates in the same hole 211, in the fabric, during the time the mechanism is running by momentum, and the bobbin thread is looped around the needle thread. These loops indicated at 212, are drawn up through and above the fabric, because the latter is stationary and no needle thread is fed to the needle and as the bobbin thread is freely drawn from the bobbin it is so to speak, piled up in loops around the needle thread, as indicated. These loops are formed between the time the stop motion is tripped and the time the machine comes to a complete stop, and it is quite essential that the needle thread be held taut during this period, which will now be described.

When the centrifugally operated pawl of the stop motion device strikes its coöperating stationary stop, it oscillates the collar 6, which necessarily moves the pin 170. This pin 170 contacts with the end 169, of the lever 167, and the opposite end of the latter contacts with the lever 171, to separate the tension disks, thereby releasing the tension on the needle thread. Also at the time the stop motion device is operated the frame 160, in transferring the power belt from the fast to the loose pulley, pulls on the rod 161, and causes the head 164, to impinge against the tension disks 165, which increases the tension on the needle thread, above the normal tension. This action practically prevents the thread being drawn out farther and that extending between the needle and the fabric is taut when the needle reaches its elevated position. It will be understood that the frame 160, moves in advance of the operation of the collar 6, hence the increased pressure on the tension disks 165, takes place preceding the release of the tension on the thread by the tension disks 174. The purpose of increasing the tension above the normal or rather preventing further feeding of the thread is to insure said thread being taut at the time of the formation of the series of loops of the bobbin thread above the fabric as previously described. Were it not for this increased tension it would require a greater number of loops, and furthermore the needle thread would have a tendency to sag, and the action of the combined pull-off and cutter, would not be so effective in operation. When the pin 170, is moved, to its normal position in stopping the machine, it elevates the links 151 and 152 which raises the end of the bar 149, out of the plane of the lug 156, which will permit the operator to manually operate the yoke 109. It will be seen therefore, that once the stitching operation is started, it will be impossible for the operator to manipulate the yoke, which adds greatly as a safeguard against breaking of the parts.

In describing the operation of the machine, I have not referred to the fact that the tension on the needle thread is automatically released at the time the purl stitches 205, and 208, are being formed, for the reason that this feature is quite well known in the art. However it may be stated, that the end 14$^c$ of the arm 14, is extended beyond the pivotal point 47, and as it is raised and lowered by the various cam edges on the flange 29, it strikes a lug 171$^a$, on the lever 171, and causes the beveled end of the latter to engage the tension disks 174, and thereby releases the tension on the needle thread. This action takes place during the time the end barring stitches are formed, so as to allow ample thread to be fed to the needle at the time of its greatest lateral movement.

Just before the stitching mechanism is stopped, the arm 138, comes into contact with the arm 146, to throw into operation the cutting mechanism 15 to effect the severing of the fabric to form an opening between two rows of purl stitches, in the usual manner. It will be understood that the arm 138 may be so adjusted on the shaft 28$^a$, that it will trip the cutting mechanism 15, to form the opening in the fabric preceding the formation of the stitches. The stitching mechanism having now been stopped, and the needle bar elevated above the cloth clamp, the series of loops 212, are held between the needle, and the fabric, as shown in Fig. 9, and it only remains to operate the combined pull-off and cutter to sever the threads.

It has been previously stated that when the machine was started to form the buttonhole stitches just described, the lever 120, was at the rear of the arm 100 which precluded the operation of the combined pull-off and cutter, but upon the first movement of the cloth clamp, in the formation of the first row of purl stitches 205, it necessarily carried with it the arm 100, and thereby permitted the lever 120, to be moved, outwardly on its pivot, under the influence of the spring 118, as indicated in dotted lines, in Figs. 2 and 6, so that when the cloth clamp is turned to normal position after the completion of the stitching operation, the lever 120, will be positioned to strike the end of the arm 100, to effect the operation of the combined pull-off and cutter. The operator depresses the handle 122, and thereby tilts the yoke 109, and, in so doing moves the link 112, and the lug 114, contacts with the upturned end of the link 116, to impart motion to the lever 120. The lever strikes the arm 100 and rocks it on its pivot to permit the spring 99 to operate the combined pull-off and cutter. The movement of the link 112, operates the frame 128, for drawing the thread from the bobbin, and holding the same, while the threads are being severed. When the lever 120, strikes the arm 100, it sweeps on its pivot the outer curved end 94 of the combined pull-off and cutter past the series of loops 212, on the needle thread, as shown in dotted lines in Fig. 7. The needle thread and the loops are now in the path of movement of the curved surface 94ª, of hooked end 94. The lever 120 sweeps past the end of the arm 100, when the spring 99, will immediately pull the combined pull-off and cutter back to its normal operative position, and the lever 120 will therefore be held against the opposite side of the said arm 100, when the yoke is returned to normal position. When the spring 99 draws the hooked end 94, of the combined pull-off and cutter, in the throat formed between the thread clamping element, and the stationary shear plate, it performs three distinct functions: The underside cut-away portion 95, will first draw the needle thread and the series of loops thereon, in the throat. Then upon further movement the lower edge 95′, contacts with the stationary shear plate 86, and automatically severs the needle thread and the loops carried thereby. The third function performed by this device is, that when the threads are drawn into the throat the end of the needle thread is clamped between the thread clamping element, 89, and the upper surface of the combined pull-off and cutter and is held for the next subsequent stitching operation. The two threads it will be observed, are severed on the inside row and at the starting point 200 of the formation of the button-hole stitches, and close to the fabric. The movement of the handle 122, operates the arm 125, which causes the pin 126 to engage the wall of the crimp 130, and advances the frame, so that its end 132 will pull the thread from the bobbin and against the adjustable stop 132′, and hold the thread in this position until pressure on the handle is released. As it is essential that the bobbin thread be held secure preceding the operation of the combined pull-off and cutter, and as they are both operated by the same movement of the handle, the pin 126 will, after the end 132, of the frame reaches the stop 132′ slip out of the crimp 130. The pin 126, when it is forced out of the crimp, tends to press the frame laterally against the side flange of the base 1 with sufficient force to hold it in this position, as shown in dotted lines in Fig. 5. At the time the bobbin thread is securely held between the end 132, and stop 132′ the lever 120, strikes the arm 100. Now as the handle 122 is further depressed it follows that it will contact with the arm 135, and thereby rock the shaft 60. When the shaft 60, is rocked, the entire cloth clamp 62, is elevated from the upper surface of the base of the machine, and the fabric with the completed button-hole can be removed, it having been made plain that, at this time, the needle thread is held between the thread clamping element 89, and the upper surface of the combined pull-off and cutter, and the bobbin thread is held between the end 132 of the frame and the adjustable stop 132′. As the bobbin thread has been pulled out sufficiently, it matters whether or not pressure on the handle 122, has been released and the thread released from the stop 132′ before inserting a new piece of fabric. However the end of the needle thread will be positively held, irrespective of any movement which may be imparted to the handle 122, for the reason, that as before stated when the previous threads were severed, the lever 120 assumed an inoperative position back of the arm 100.

In Fig. 13, I have shown diagrammatically the stitches in magnified form. Associated with these stitches I have also shown diagrammatically the toggle levers, and the various positions of the pivotal point or roller of the connection operating therewith. Also in this figure I have illustrated the cams which operate the cloth clamp, and the roller in the toggle levers, dotted lines being drawn from the various parts of the cams, and the various positions of the roller in the toggle levers to the stitches, to illustrate in a conventional manner just which features of the various elements form the respective stitches.

A button hole having stitches formed by the mechanism herein described, is strong, and because of the tying of the threads at each end of the cycle of movement, the same will not unravel. Furthermore, by reason of the various lengths of stitches forming the end bars, one over the other, the threads are tied into the fabric, and serve very materially to strengthen the button-hole.

In order to change the machine to make button-holes of various lengths, it is only necessary to change the cams, which as previously stated are both formed on a single element. Therefore, this feature is of material importance, as it does not require any minute adjustment of the parts to arrange the mechanism when such a change is desired.

The invention is not limited in its operation to connection such as the toggle levers herein described, as it is evident any approved means for laterally vibrating the needle bar may be substituted. For instance, the nest of cams, fully described and claimed in my Patent No. 1,033.721, dated July 23, 1912, may be substituted.

When the device for holding the bobbin threads in operative position, and the work clamp is elevated and the fabric removed, the latter will be drawn from the bobbin thread, because the latter is held stationary by the holding device, which prevents withdrawing of surplus thread when removing the work.

It will be noticed that the threads are severed at the point where the stitching operation commences, which will not mar the stitches, as would be the case if severed at other points. Furthermore, the thread is severed directly over the point where the first stitch was formed, but it is obvious that if for any reason I find it advantageous to sever the threads at another point, I may do so.

The peculiar construction of the clamp and the member on which it is mounted, permits of adjustment toward and from the needle, as well as laterally therefrom. The parts are so arranged that this adjustment can be made without the necessity of moving a great many of the elements, as the support is arranged so that by merely adjusting the screws the work clamp can be moved without in any wise throwing out of adjustment any of the other mechanism.

What I claim is:

1. In a button hole machine, the combination of stitch forming mechanism including a needle bar and looper, means for operating the needle bar and looper to form a series of loops of one thread around the other thread, on one side the fabric being operated upon means for stopping the feeding of the thread around which the loops are formed and at the time of forming said loops, and a trimming device to sever the threads intermediate the ends of the loops.

2. In a button hole machine, the combination of stitch forming mechanism including a needle bar and looper, means for operating the needle bar and looper to form a series of loops of one thread around the other thread, on one side the fabric being operated upon, means for stopping the stitch forming mechanism after the threads have been looped, and a manually operated trimming device to sever the threads where the loops occur including means for holding the severed end of the needle thread.

3. In a button hole machine, the combination of a base, stitch forming mechanism including a needle bar and looper means for operating the needle bar and looper, to form a series of loops of one thread around the other thread, above the base and above the fabric being operated upon, and a trimming device located above the base to sever the threads intermediate the ends of the loops.

4. In a button hole machine, the combination of stitch forming mechanism including a needle bar and bobbin, means for operating the needle bar and bobbin to form a series of loops of the bobbin thread around the needle thread above the fabric being operated upon, and a trimming device to sever the threads above the fabric intermediate the ends of the loops.

5. In a button hole machine, the combination of stitch forming mechanism including a needle bar and bobbin means for operating the needle bar and bobbin to form stitches, means for causing the needle bar to reciprocate in the same place to form a series of loops of the bobbin thread around the needle thread above the fabric being operated upon, a combined pull off and trimmer, a clamp with which the combined pull off and trimmer coöperates, and means for operating the combined pull off and trimmer, whereby the threads where the loops occur will be first drawn to and held against the clamp to secure the needle thread for the next stitching operation and subsequently both the needle and bobbin thread will be severed intermediate the ends of the loops.

6. In a button hole machine, the combination of stitch forming mechanism a needle bar, a cloth clamp, a looper having a bobbin, means for creating relative lateral vibratory movement between the needle bar and cloth clamp, a stop motion device, means operating in conjunction with the stitch forming mechanism for forming a series of loops with the threads from the needle and bobbin on one side of the fabric being operated upon after the stop motion device has been operated, mechanism for severing the threads where the loops are formed and including means for holding the ends of the needle thread before and after the severing operation.

7. In a button hole machine, the combination of stitch forming mechanism, a needle bar, a cloth clamp, a looper having a bobbin, means for creating relative lateral vibratory movement between the needle bar and cloth clamp, a stop motion device, means operating in conjunction with the stitch forming mechanism for forming a series of loops with the threads from the needle and bobbin on the upper side of the fabric being operated upon, manually operated means for severing the threads which are formed into loops after the stop motion device is operated.

8. In a button hole machine, the combination of stitch forming mechanism including a needle bar and looper having a bobbin, a work clamp, mechanism for automatically imparting to the work clamp an intermittent movement backward and forward under the needle bar, a combined pull off and cutter mounted on the work clamp, means for operating the needle bar and looper to form stitches, means for operating the needle bar in the same place to form a plurality of loops of the bobbin thread on the needle thread above the material being operated upon, and manually controlled means for operating the combined pull off and cutter to sever the bobbin and needle threads intermediate the ends of the loops.

9. In a button hole machine, the combination of stitch forming mechanism including a needle bar and looper having a bobbin, mechanism for operating the stitch forming mechanism to form a plurality of loops of the bobbin thread on the needle thread at the end of a cycle of operation of forming a series of stitches and at the point of commencement of said stitches, means for automatically stopping the stitching mechanism, the series of loops being held on the needle thread between the needle and the fabric, a device for severing the loops and the needle thread above the fabric and means for operating the latter device, the said latter means assuming an inoperative position behind the severing device after each operation of the latter.

10. In a button hole sewing machine, the combination with stitch forming mechanism including a needle bar and looper having a bobbin, means for creating lateral vibratory movement between the needle bar and looper, which also includes means for stopping the lateral vibratory movement to cause the stitch forming mechanism to form a series of loops above the fabric being operated upon, a stop motion device including means for permitting the stitch forming mechanism to be operated by momentum between the time said stop motion device is first operated and the time it stops the movement of the stitch forming mechanism, the series of loops being formed while the stitch forming mechanism is operated by momentum, and a manually operated pull off and cutter to sever the needle and bobbin threads where the loops are formed.

11. In a button hole sewing machine, the combination with stitch forming mechanism including means for forming a predetermined number of stitches, means for reciprocating the needle bar in the same place to form a number of loops above the material being operated upon, a work clamp, a combined pull off and cutter carried by the work clamp, manual means for operating the combined pull off and cutter to hold the thread and sever the thread intermediate the ends of the loops, and subsequently elevating the work clamp.

12. In a button hole sewing machine, the combination with stitch forming mechanism including means for forming a predetermined number of stitches, means for reciprocating the needle bar in the same place to form a number of loops above the material being operated upon, a work clamp, a combined pull off and cutter carried by the work clamp, manual means for operating the combined pull off and cutter to hold the thread and sever the thread intermediate the ends of the loops.

13. In a button hole sewing machine, the combination with stitch forming mechanism including means for forming a predetermined number of stitches and a number of loops above the material being operated upon, a work clamp, a combined pull off and cutter carried by the work clamp, manual means for operating the combined pull off and cutter to hold the thread and sever the thread where the loops are formed, and subsequently elevating the work clamp, said manual means including a device which after the operation of the combined pull off and cutter has taken place will assume an inoperative position until the next successive operation of the machine occurs.

14. In a button hole sewing machine, the combination with stitch forming mechanism including means for forming predetermined stitches, means for reciprocating the needle bar in the same place to form a plurality of loops above the material being operated upon at the termination of the stitches, a work clamp, means for intermittently moving the work clamp back and forth and including a shaft, a combined pull off and cutter carried by the work clamp, manual means for operating the combined pull off and cutter to hold the thread and sever the same intermediate the ends of the loops, the said manual means being located to rock the shaft and elevate the work clamp after the combined pull off and cutter is operated.

15. In a lock stitch button hole sewing machine, the combination of stitch forming mechansm including means for tying the needle thread and the bobbin thread previous to the formation of the stitches and also means for tying the needle thread and bobbin thread at the end of the stitching operation and forming a plurality of loops above the stitches, a combined pull off and cutter for severing the two threads where the loops are formed, a device for holding the bobbin thread at the time the combined pull off and cutter is operated and manual means for first operating the device to hold the bobbin thread and subsequently operating the combined pull off and cutter.

16. In a lock stitch button hole sewing machine the combination of stitch forming mechanism including means for tying the needle thread and the bobbin thread previous to the formation of the stitches and also means for tying the needle thread and bobbin thread at the end of the stitching operation and forming a plurality of loops above the work, a work clamp, a combined pull off and cutter for severing the two threads where the loops are formed and which is mounted on the work clamp, a device for holding the bobbin thread at the time the combined pull off and cutter is operated, and manual means for first operating the device for holding the bobbin thread and subsequently operating the combined pull off and cutter and elevating the work clamp.

17. In a button hole sewing machine the combination with stitch forming mechanism including means for forming a plurality of loops above the material being operated upon, a work clamp secured to a sliding element, a combined thread pull off and cutter, a manually operable element carrying means for operating the combined thread pull off and cutter and which is spaced from the sliding element, the manually operable element when depressed tripping the thread pull off and cutter to sever the thread where the loops are formed and subsequently operating on the sliding element and lifting the work clamp.

18. In a button hole sewing machine, the combination of stitch forming mechanism including means for causing the needle bar to reciprocate in the same place to form a series of loops above the fabric being operated upon, a work clamp, a combined thread pull off and cutter mounted on the work clamp, and manual means for operating the thread pull off and cutter to sever the thread intermediate the ends of the loops.

19. In a lock stitch button-hole machine the combination of stitch forming mechanism including means for forming a series of loops of the bobbin thread around the needle thread above the material being operated upon, a combined thread pull off and cutter, a device located below the plane of the material operated upon for holding the bobbin thread during the time the cutter is operating, and manual means for operating the combined pull off and cutter to sever the threads where the loops are formed, the bobbin thread holding device permitting of the material being withdrawn without pulling out the bobbin thread.

20. In a button hole sewing machine the combination with stitch forming mechanism including a needle bar, and coöperating looper with a bobbin and means for operating the same to form a plurality of loops of the bobbin thread around the needle thread at the end of the stitching operation, a work clamp, two spaced elements mounted on the work clamp to provide a throat, a pivotally mounted combined pull off and cutter adapted to introduce the needle and bobbin threads, where the loops are formed into the throat whereby to hold the end of the needle thread whereby to sever the needle and bobbin threads above the fabric, a spring for forcing the combined pull off and cutter into the throat, a manually operated trip for setting the combined pull off and cutter, so that the spring can operate the same, and means for holding the bobbin thread during the time of operation of the combined pull off and cutter, a pivotally mounted manually operated trip for engaging the combined pull off and cutter so that the spring can set the same, the operative end of the trip being located so as to sweep past the combined pull off and cutter and assume an inoperative position until the next successive stitching operation and means for holding the bobbin thread during the time the combined pull off and cutter is operated.

21. In a button hole sewing machine the combination with stitch forming mechanism including a needle bar and coöperating looper with a bobbin and means for operating the same to form a plurality of loops of the bobbin thread around the needle thread at the end of the stitching operation, a work clamp, two spaced elements mounted on the work clamp to provide a throat, a pivotally mounted combined pull off and cutter adapted to introduce the needle and bobbin threads where the loops are formed into the throat whereby to hold the end of the needle thread and subsequently sever the needle and bobbin threads above the fabric, a spring for forcing the combined pull off and cutter into the throat, a pivotally mounted manually operated trip for engaging the combined pull off and cutter so that the spring can set the same, the operative end of the trip being located so as to sweep past the combined pull off and cutter and assume an inoperative position until the next successive stitching operation, and means for holding the bobbin thread during the time the combined pull off and cutter is operated.

22. In a button hole machine the combination of stitch forming mechanism including a needle bar and looper having a bobbin and means for forming a plurality of loops of the bobbin thread around the needle thread a stop motion device and needle thread tension device operated by the stop motion device to prevent the feeding of the needle thread at the time the loops are formed and a combined pull off and cutter for severing the needle and bobbin threads above the fabric where the loops are formed.

23. In a button hole machine the combination of stitch forming mechanism including a needle bar and looper having a bobbin and means for forming a plurality of loops of the bobbin thread around the needle thread, two spaced plates forming a throat, an element formed with a hooked end with its inner surface reduced, the hooked end normally fitting in the throat, the reduced portion drawing the threads therein and clamping the same between the opposite surface of the hooked element and one of the plates forming the throat and the remaining portion of the element coöperating with the opposite plate of the throat and severing the threads above the fabric where the loops are formed and means for operating the element.

24. In a button-hole machine, the combination of stitch forming mechanism including a looper having a bobbin, feeding means, means for creating a relative vibratory movement between the stitch forming mechanism and the feeding means, means for stopping the vibratory movement between the stitch forming mechanism and the feeding means, to produce a series of loops of the bobbin thread around the needle thread, manually operable means for severing the needle and bobbin threads where the loops are formed and including means for holding the needle thread, means for raising and lowering the feeding means, said latter means having a part in the path of movement of the manually operable serving means whereby to lift the feeding means after the threads are severed.

25. In a button-hole machine, the combination of stitch forming mechanism including a looper having a bobbin, feeding means, means for creating a relative vibratory movement between the stitch forming mechanism and the feeding means, means for stopping the vibratory movement between the stitch forming mechanism and the feeding means to produce a series of loops of the bobbin thread around the needle thread, manually operable means for severing the needle and bobbin threads including an operating lever provided with two flat surfaces and a cut away portion, a pivotally mounted rocking element, a lever yieldingly connected to the pivotally mounted rocking element, said lever being in the path of movement of the operating lever, means for holding the bobbin thread while the severing operation is being performed, means for lifting the feeding means including an element in the path of movement of the manually operable severing means and adapted to be struck thereby to elevate said feeding means.

26. In a button-hole machine, the combination of stitch forming mechanism, including a needle bar, a looper having a bobbin, means for causing the needle bar to operate in the same place at the beginning of the stitching operation, means for laterally vibrating the needle bar, means for causing the needle bar to operate in the same place at the end of the stitching operation to form a series of loops of the bobbin thread around the needle thread, a combined feeding and clamping device, means for holding the latter stationary during the time the needle bar is operating in the same place and intermittently moving the same during a part of the time the needle is laterally vibrated, and means for severing the needle and bobbin threads where the loops are formed.

27. In a button-hole machine, the combination of stitch forming mechanism, including a needle bar, a looper having a bobbin, means for causing the needle bar to operate in the same place at the beginning of the stitching operation, means for laterally vibrating the needle bar, means for causing the needle bar to operate in the same place for a greater length of time at the end of the stitching operation than at the beginning of the stitching operation, whereby to form a series of loops of the bobbin thread around the needle thread, a tension device for holding the needle thread taut near the end of the stitching operation and at the time of the formation of the loops, a combined feeding and clamping device, means for holding the latter stationary during the time the needle bar is operating in the same place and intermittently moving the same during a part of the time the needle is laterally vibrated, and means for severing the needle and bobbin threads where the loops are formed.

28. In a button-hole machine, the combination of stitch forming mechanism including a looper having a bobbin, a needle bar, means for laterally vibrating the needle bar for a determinate time in different planes, means for varying the lateral vibrations of the needle bar for a certain length of time in a cycle of operation, means for causing the needle bar to reciprocate in the same place for a determinate period in the cycle of operation so as to form a series of loops of the bobbin around the needle thread, a tension device for holding the needle thread taut during the formation of the loops, stopping mechanism for stopping the stitch forming mechanism after the formation of the loops, and manually controlled means for severing the needle and bobbin threads where the loops are formed.

29. In a button-hole machine, the combination of a combined feeder and clamp, means including a worm, a gear and a cam for intermittently moving the combined feeder and clamp, a reciprocating needle bar, power operating means, means including a revolving cam and a toggle connection for laterally vibrating said needle bar to form stitches, a stop motion device provided with means whereby it will for a period after being disconnected from the power operating means run by momentum and vertically reciprocate the needle bar in the same place to form a series of loops of the bobbin thread around the needle thread, and means for severing the needle and bobbin threads where the loops are formed.

30. In a buttonhole machine, the combination of stitch forming mechanism including a reciprocating needle bar and looper having a bobbin, means for laterally vibrating the needle bar, means for causing the needle bar to reciprocate in the same place at the end of a cycle of stitching operation to form a series of loops of the bobbin thread around the needle thread, means for severing the needle and bobbin threads where the loops are formed, a rocking connection for operating said latter means, a device for holding the bobbin thread during the severing operation including a yielding frame provided with a seat and a rocking element to engage the seat, and a connection between the latter rocking element and the rocking connection for the severing means.

31. In a button-hole machine, the combination of stitch forming mechanism, including a needle bar and looper having a bobbin means for vibrating the needle bar, a combined cloth feeder and clamp, means for causing the needle bar to reciprocate in the same place for forming a series of loops of the bobbin thread around the needle thread, a thread severing device, a rock shaft, a connection between the rock shaft and the combined cloth clamp and feeder, a lever for operating the thread severing means, and a connection between the lever and the rock shaft including a spring which will permit the rock shaft to be returned to normal position after the lever operates the thread severing means, the said lever remaining in an inoperative position.

32. In a button-hole machine, the combination of stitch forming mechanism including a needle bar and looper having a bobbin, means for laterally vibrating the needle bar, means for reciprocating the needle bar in the same place at the end of the vibratory movement to form a series of loops of the bobbin thread around the needle thread, manual means for severing the needle and bobbin threads where the loops are formed, said means having an arm, a tilting yoke, a lever operable in the path of the arm, a link connected to the lever, a rod extending from the yoke, and provided with a guide through which the link passes, a spring on the link and engaging the guide, and a handle for operating the yoke, whereby the arm of the thread trimming means will be operated to sever the threads and the spring will assist the yoke to assume its normal position.

33. In a button-hole machine, the combination of stitch forming mechanism, including a needle bar and looper having a bobbin, means for laterally vibrating the needle bar, means for causing the needle bar to reciprocate in the same place at the end of the vibratory movement for forming a series of loops of the bobbin thread on the needle thread, a combined cloth clamp and feeder, means for intermittently moving the combined cloth clamp and feeder including means for holding said cloth clamp and feeder stationary while the stitch forming mechanism is forming the loops, a thread trimming device carried by the cloth clamp and feeder, an arm extending from the thread trimming device, manually operable means including a lever to coöperate with the arm to operate the trimmer when the cloth clamp and feeder is in normal position, and means for preventing operation of the lever once the thread trimmer is operated until a subsequent operation of the stitch forming mechanism.

34. In a button-hole machine, the combination of stitch forming mechanism including a needle bar and looper having a bobbin, means for laterally vibrating the needle bar, means for causing the needle bar to reciprocate in the same place at the end of the vibratory movement for forming a series of loops of the bobbin thread on the needle thread, a combined cloth clamp and feeder means for intermittently moving the combined cloth clamp and feeder including means for holding said cloth clamp and feeder stationary while the stitch forming mechanism is forming the loops, a thread trimming device carried by the cloth clamp and feeder, and means for preventing operation of the trimming device until subsequent operation of the cloth clamp and feeder and the stitching operation.

35. In a button-hole machine, the combination of stitch forming mechanism, including a needle bar and looper, means for laterally vibrating the needle bar, a revolving cam for positioning the latter means and including surfaces for imparting to the needle bar lateral vibrations of different lengths to form side stitches and end bar stitches, means for causing the needle bar to reciprocate in the same place at the beginning of the stitching operation, means for causing the needle bar to reciprocate in the same place at the end of the stitching operation to form a series of loops of the bobbin thread around the needle thread, and means for severing the threads through the series of loops.

36. In a buttonhole machine, employing a plurality of threads, the combination of stitch forming mechanism for forming stitches around a buttonhole including a needle bar and looper, said stitch forming mechanism also including means for reciprocating the needle bar in a definite path after the stitches around the buttonhole are completed, whereby to form one thread in a series of loops about the other and extending through and beyond the fabric, and means for severing both threads intermediate the ends of the looped portion.

37. In a button-hole machine, the combination of a support stitch forming mechanism including a needle bar mounted on one side of the support, a looper mounted on the opposite side of the support, and means for drawing the thread from the looper beyond the support and around the needle thread, and means for severing the needle thread and looper thread at a point between the ends of the looper thread where same is drawn around said needle thread.

38. In a button-hole machine, the combination of a support stitch forming mechanism including a needle bar and looper, means for mounting the looper below the support, means for mounting the needle above the support, means for drawing the looper thread above the support and through and above the material operated upon and in position for severing, and means for severing the needle and looper thread above the support.

39. In a button-hole machine, the combination of stitch forming mechanism including a needle bar and looper, and means for drawing the looper thread through and above the fabric in position for severing, means for holding the fabric stationary while the looper thread is being drawn through the same, and means for severing the threads above the fabric.

40. In a button-hole machine, the combination of stitch forming mechanism including a needle bar and looper, looper thread tensioning means, needle thread tensioning means, the tension on the needle thread being greater than the tension on the looper thread, means for reciprocating the needle bar in one path for a determinate period to coöperate with the increased tension on the needle thread to form a plurality of loops of the looper thread on the needle thread, and means for severing the looper and needle threads where the loops are formed.

41. In a button-hole machine, the combination of stitch forming mechanism including a needle bar and looper, looper thread tensioning means, needle thread tensioning means, the tension on the needle thread being greater than the tension on the looper thread, means for reciprocating the needle bar in one path for a determinate period to coöperate with the increased tension on the needle thread to draw the looper thread above the fabric and form a series of loops on the needle thread and means above the plane of the fabric for severing the looper and needle threads where the loops are formed.

42. In a button-hole machine, the combination of stitch forming mechanism including a looper and a needle bar, a cloth clamp, means for forming a plurality of loops of the looper thread around the needle thread, a severing device for severing the threads where the loops are formed, and manual means for elevating the clamp after the thread severing device is operated.

43. In a button-hole machine, the combination of stitch forming mechanism including a needle bar and looper, a cloth clamp, means for forming a plurality of loops of the looper thread around the needle thread, a severing device for severing the threads where the loops are formed, manual means for operating the severing means, and mechanism operated by the means which operate the severing means for lifting the clamp after the threads are severed.

44. In a button-hole machine, the combination of stitch forming mechanism including a needle bar and looper, and means for causing the needle to reciprocate in the same place to loop the looper threads loosely around the needle threads and means for severing the threads intermediate the ends of the loops where they are looped.

45. In a button hole machine, the combination of stitch forming mechanism, including a needle bar and a looper, means for operating the stitching mechanism to form a series of loose loops around the needle thread, said loose loops extending through the fabric operated upon, and means for severing the threads intermediate the ends of said loops.

46. In a button hole machine, the combination of a movable clamp, stitch forming mechanism including a needle bar and a looper, mechanism coöperating with the movable clamp and the stitch forming mechanism for forming a plurality of loosely formed loops of the looper thread around the needle thread, said plurality of loops extending through and beyond the face of the material being operated upon and means for severing the threads intermediate the ends of the loops.

47. In a buttonhole machine, the combination of stitch forming mechanism including a needle bar and looper, a cloth clamp, means for intermittently moving the cloth clamp and stopping said intermittent movement at the termination of the formation of a series of stitches, means operating the stitching mechanism, said operating means continuing after the cloth clamp ceases its intermittent movement to reciprocate the needle bar in the same vertical position to form a plurality of loops on the needle thread, said loops extending through the material being operated upon and means for severing the threads intermediate the ends of the loops.

48. In a buttonhole machine, the combination of a support stitch forming mechanism including a needle bar and looper, means for operating the needle bar and looper, a cloth clamp coöperating with the support to hold and feed the work, a support for the cloth clamp, including a connection to permit a slight rocking movement of said cloth clamp, a cam for intermittently moving the cloth clamp and stopping the same after a plurality of stitches has been formed, the operating means for the stitch forming mechanism continuing to operate for a determinate period after the cloth clamp ceases its movement to form a plurality of loops of the looper thread around the needle thread, means for severing the threads intermediate the ends of the loops and means for operating the severing means and subsequently lifting the clamp to permit removal of the work.

49. In a buttonhole machine, the combination of stitch forming mechanism including a needle bar and looper, a cloth clamp, means for intermittently moving the cloth clamp, a tilting support for the cloth clamp and on which said clamp slides in its intermittent movement, thread severing means mounted on and carried by the clamp including a stationary plate forming one blade and a pivoted element forming a coöperating blade, means for normally closing the pivoted element on the stationary blade, after the intermittent movement of the clamp starts, means for operating the stitching mechanism to form a predetermined number of stitches and subsequently forming a plurality of loops of the looper thread around the needle thread after the stitches are formed, said loops extending through the work, and means for operating the thread severing means to sever the threads intermediate the ends of the loops, said latter operating means subsequently serving to lift the clamp after the threads are severed.

50. In a buttonhole machine, the combination of stitch forming mechanism, including a needle bar and looper, intermittently moved cloth feeding mechanism, means for holding the ends of the needle thread and the looper thread, means for operating the stitch forming mechanism to form a predetermined stitching operation and subsequently form a plurality of loops of the looper thread on the needle thread between the points where said threads are held, said holding means also serving as a thread cutter to sever the threads intermediate the ends of the loops.

51. A button-hole machine including stitch forming mechanism, employing a plurality of threads, means for operating said mechanism to form one thread in a series of loose loops about the other and extending through the fabric, and means for severing both threads intermediate the ends of the looped portion.

52. A button-hole machine including a stitch forming mechanism employing a plurality of threads, means for operating said mechanism to form one thread in a series of loose loops about the other, means for increasing the normal tension of said latter thread during the looping operation, and means for severing the threads through their looped portions.

In testimony whereof I have signed my name to this specification in the presence of two subscribing witnesses.

HENRY C. MILLER.

Witnesses:
H. R. VAN KLEECK,
GEORGE P. MEECHEM.